Figure 1:
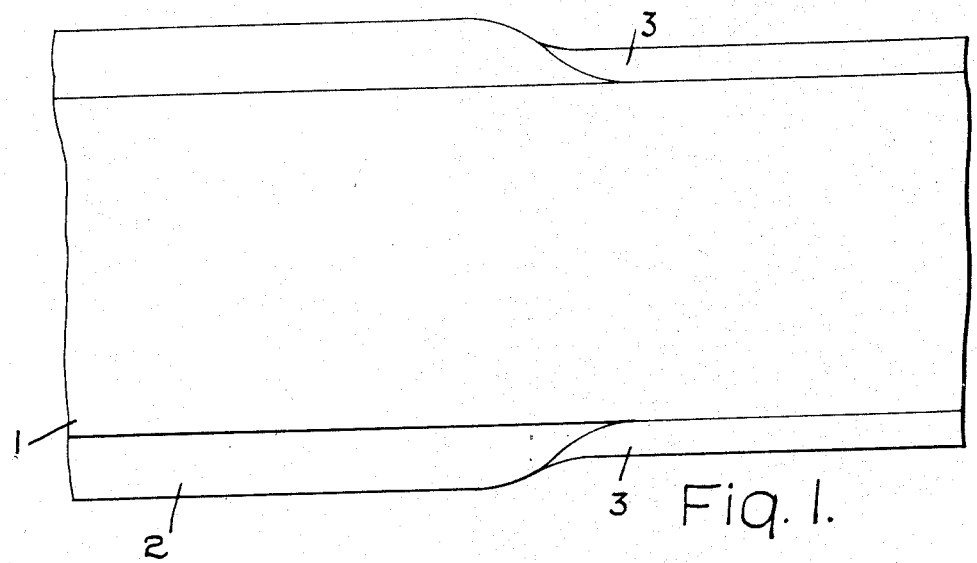

P. THOMAS.
CONDENSER AND PROCESS OF MAKING THE SAME.
APPLICATION FILED NOV. 7, 1916.

1,279,941.

Patented Sept. 24, 1918.

WITNESSES:

INVENTOR
Phillips Thomas.
BY
ATTORNEY

UNITED STATES PATENT OFFICE.

PHILLIPS THOMAS, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONDENSER AND PROCESS OF MAKING THE SAME.

1,279,941.   Specification of Letters Patent.   Patented Sept. 24, 1918.

Application filed November 7, 1916. Serial No. 130,043.

*To all whom it may concern:*

Be it known that I, PHILLIPS THOMAS, a citizen of the United States, and a resident of Edgewood Park, in the county of Allegheny and State of Pennsylvania, have invented a new and useful Improvement in Condensers and Processes of Making the Same, of which the following is a specification.

My invention relates to electric condensers, and it has for its object to provide condensers composed of metal foil and impregnated paper or other dielectric sheet material which shall be electrically and mechanically efficient and which, in particular, shall be free from unbalanced stresses and tendency to puncture at the edges of the laminations.

Another object of my invention is to provide a process of making condensers of the above-indicated character that shall include a simple method of improving the structure of the condensers and preventing their deterioration in use.

More specifically, my invention is concerned with the manufacture of rolled condensers made by associating a strip of metal foil with a strip of paper and winding the associated strips upon a mandrel. In such condensers, it is necessary to provide ample creepage distance between the edge of each lamination of metal foil and that of the adjacent metallic lamination of opposite polarity, and, for this reason, the intermediate laminations of paper must be considerably wider than the metal foil which constitutes the conducting portion of the condenser. If the metal foil and the paper are of equal thickness, the edges of the stack or roll of superposed laminations contain only one-half as much material as the central portions and this disparity in thickness increases if the dielectric layers are thinner than the metal layers.

The difference in thickness between the edges and the central portions of the condensers of the kind to which my invention relates leads to many manufacturing difficulties, among which may be mentioned the crushing of the paper at the edges of the metal foil and the consequent weakening or even puncturing of the dielectric layers if any considerable pressure is applied to the condenser during its manufacture. The metal foil also tends to become displaced from its proper symmetrical position with respect to the paper during the winding operation.

Figure 2:
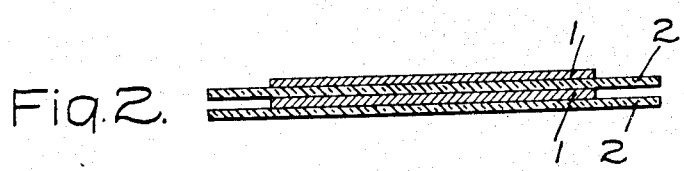
Figure 3:
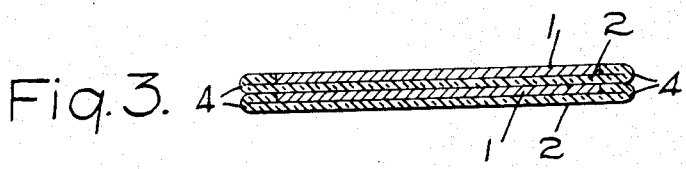
Figure 4:
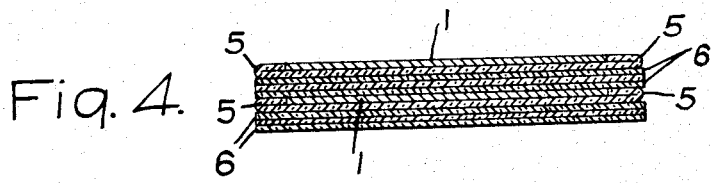

According to my present invention, I avoid the difficulties mentioned above by folding the edges of the dielectric layers to compensate for the thickness of the metal foil, thus giving to the edges of the completed condenser the same thickness as its central portions. One method of applying my invention to the manufacture of rolled conductors is illustrated in the accompanying drawing in which:

Figure 1 is a fragmentary plan view showing two associated strips of metal foil and paper before and after the folding operation is performed. Fig. 2 is an enlarged transverse sectional view showing several superposed layers of paper and dielectric material. Fig. 3 is a transverse sectional view illustrating the relation of the laminations shown in Fig. 2 after the folding or crimping operation, and Fig. 4 is another transverse sectional view, similar to Fig. 3, showing the arrangement of the laminations when each sheet of metal foil is separated by more than one dielectric sheet.

As shown in Fig. 1, a strip of metal foil 1 is placed in the center of a wider strip of paper 2. Several such pairs of strips may be superposed in the manufacture of a single condenser, and, at some time before the winding operation, the edges of the strip 2 are given a single fold, as shown at 3, which may be accomplished by means of any suitable crimping tool. The edges of each pair of associated sheets are thus made equal in thickness to the central portions and the metal strip 1 is thereby prevented from lateral movement during the winding operation.

Two sheets 1 of metal foil, with their associated dielectric sheets 2, are shown in Fig. 3 in the relation which these sheets occupy in the finished condenser, the folds of the dielectric sheets 2 being indicated at 4. Fig. 4 illustrates a modified arrangement which I employ when each layer of metal foil is separated by several sheets of paper and when, as is often the case, the paper and the foil are of about the same thickness. In this case, only the sheet of paper next to the metail foil is crimped at the edges, as shown at 5, the remaining sheets of paper 6 being preferably cut somewhat narrower than the folded sheets so that the entire stack shall be of the same thickness throughout.

If the dielectric sheet material is considerably thinner than the metal foil, it may be necessary to provide two or more folds at the edges of the dielectric layers in order to compensate for the full width of the conductor.

My invention is particularly useful in the manufacture of rolled condensers, but it is also applicable to the manufacture of condensers, made by stacking alternate sheets of metal foil and dielectric material, the dielectric sheets in such case being provided with folds of the proper width at their edges before the stacking operation.

My invention may be applied to the manufacture of other laminated articles in which laminations of different widths are employed, and it is therefore to be understood that no limitations are to be imposed upon my invention except such as are indicated in the appended claims.

I claim as my invention:

1. The method of making laminated articles that comprises associating two strips of sheet material of different widths, folding the edges of the wider strip to substantially touch the edges of the narrower strip, and winding the associated strips to form the said strips into a plurality of superposed layers.

2. The method of making electric condensers that comprises placing a strip of metal foil in the center of a wider strip of dielectric material, folding the edges of the wider strip to substantially touch the edges of the strip of metal foil, and winding the associated strips into a plurality of superposed layers.

3. An electric condenser composed of alternate conducting and dielectric laminations, the dielectric laminations being wider than the conducting laminations and being folded at their edges to make the edges of the condenser of substantially the same thickness as the central portions.

4. An electric condenser composed of alternate laminations of metal foil and dielectric sheet material, the dielectric laminations being wider than the laminations of metal foil and being folded at their edges.

5. A rolled condenser composed of strips of metal foil and dielectric sheet material wound together, the dielectric strip being wider than the strip of metal foil and being folded at its edges.

6. A rolled condenser composed of strips of metal foil and dielectric sheet material wound together, the dielectric strip being wider than the strip of metal foil and being provided with a single fold at each of its edges to compensate for the thickness of the metal foil.

7. A rolled condenser composed of one or more strips of metal foil and a larger number of strips of dielectric sheet material wound together, at least one of the said dielectric strips adjacent to each strip of metal foil being wider than the metal foil and being folded at its edges to compensate for the thickness of the said foil.

8. The method of making laminated articles that comprises folding over the longitudinal edges of a strip of material and interposing a second strip of material between such edges and upon the first strip and winding the associated strips into a roll.

9. The method of making electric condensers that comprises superimposing a strip of metal foil upon a wider strip of dielectric material, folding the edges of the wider strip into juxtaposition to the edges of the foil strip to centralize the latter with respect to the former and winding the associated strips into a roll.

10. An electric condenser composed of a plurality of superimposed strips of dielectric material each having its longitudinal edges folded inwardly, whereby the main bodies of the strips are spaced from each other, and a plurality of strips of metal foil positioned in, and substantially filling, such spaces.

11. A rolled condenser comprising strips of metal foil and dielectric sheet material wound together with the edges of the dielectric sheets folded to compensate for the thickness of the foil.

In testimony whereof, I have hereunto subscribed my name this 31st day of Oct. 1916.

PHILLIPS THOMAS.